US011934117B2

(12) United States Patent
Ishizumi et al.

(10) Patent No.: US 11,934,117 B2
(45) Date of Patent: Mar. 19, 2024

(54) IMAGE FORMING APPARATUS

(71) Applicant: CANON KABUSHIKI KAISHA, Tokyo (JP)

(72) Inventors: Keisuke Ishizumi, Kanagawa (JP); Shinji Katagiri, Kanagawa (JP); Koji An, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/930,334

(22) Filed: Sep. 7, 2022

(65) Prior Publication Data

US 2023/0082217 A1 Mar. 16, 2023

(30) Foreign Application Priority Data

Sep. 8, 2021 (JP) ................................ 2021-146410
Mar. 22, 2022 (JP) ................................ 2022-045081

(51) Int. Cl.
*G03G 15/16* (2006.01)

(52) U.S. Cl.
CPC .................................. *G03G 15/162* (2013.01)

(58) Field of Classification Search
CPC .................................................... G03G 15/162
See application file for complete search history.

(56) References Cited

U.S. PATENT DOCUMENTS 5,899,610 A * 5/1999 Enomoto ............ G03G 15/162 399/302
2014/0023412 A1* 1/2014 Kawaguchi ........ G03G 15/0131 399/302
2018/0032001 A1* 2/2018 Yoshida ............ G03G 15/5054
2019/0302656 A1* 10/2019 Ishizumi ........... G03G 15/5058

FOREIGN PATENT DOCUMENTS

JP 2010-044329 A 2/2010
JP 2013-231960 A 11/2013
JP 2015-194782 A 11/2015
JP 2018-036624 A 3/2018

OTHER PUBLICATIONS

"Resistivity Measuring Systems—Mitsubishi Chemical Analytech" (Year: 2010).*

* cited by examiner

*Primary Examiner* — Carla J Therrien
(74) *Attorney, Agent, or Firm* — Canon U.S.A., Inc. I.P. Division

(57) ABSTRACT

An image forming apparatus includes an image bearing member, an intermediate transfer belt, and a contact member. The intermediate transfer belt includes a base layer, a surface layer formed on an outside of the base layer, and an inner surface layer formed on an inner side of the base layer. A position at which the contact member and the intermediate transfer belt contact is arranged on a downstream side of the intermediate transfer belt in a rotation direction of the intermediate transfer belt. Rv>Rs1 and Rs2>Rs1, and Rs2/Rv≤40 are satisfied where Rv (Ω) is a volume resistance value of the intermediate transfer belt in a thickness direction, Rs1 (Ω) is a first surface resistance value of the inner surface layer side in a surface direction, and Rs2 (Ω) is a second surface resistance value on the surface layer side in a surface direction.

16 Claims, 9 Drawing Sheets

IMAGE FORMING APPARATUS

BACKGROUND

Field

The present disclosure relates to an image forming apparatus, such as a laser printer, a copying machine, and a facsimile machine, employing an electrophotographic method.

Description of the Related Art

Heretofore, an image forming apparatus including an intermediate transfer member has been known.

In such the image forming apparatus, in a primary transfer process, a toner image formed on a surface of a photosensitive drum is primarily transferred onto an intermediate transfer member by applying a voltage to a primary transfer member disposed facing the photosensitive drum (primary transfer portion). Further, a toner image of a plurality of colors is formed on the surface of the intermediate transfer member by repeating the primary transfer process for toner images of the plurality of colors.

Then, in a secondary transfer process, the toner images of the plurality of colors formed on the surface of the intermediate transfer member are collectively transferred onto the surface of a recording medium such as a paper sheet by applying a voltage to a secondary transfer member. The toner image transferred onto the surface of the recording medium is then fixed onto the recording medium by a fixing unit to form a color image.

Japanese Patent Application Laid-open No. 2018-036624 discusses a configuration in which, to improve transferability, a low resistance layer is formed on an inner circumferential surface of a base layer of an intermediate transfer belt and a primary transfer voltage is applied to cause an electrical current to flow in a circumferential direction of the intermediate transfer belt from the first transfer member.

SUMMARY

The present disclosure is directed to an image forming apparatus capable of suppressing occurrence of image defects while achieving excellent primary transferability of an intermediate transfer belt including three or more layers.

According to an aspect of the present disclosure, an image forming apparatus includes an image bearing member configured to bear a toner image, an intermediate transfer belt configured to contact the image bearing member and to which the toner image is to be transferred from the image bearing member, wherein the intermediate transfer belt is endless and conductive and includes a base layer, a surface layer formed on an outer circumferential surface side of the base layer, and an inner surface layer formed on an inner circumferential surface side of the base layer, and a contact member configured to contact the intermediate transfer belt from an opposite side of the image bearing member contacting the intermediate transfer belt, wherein, with respect to a rotation center of the image bearing member and as seen from a rotation shaft direction of the image bearing member, a position at which the contact member and the intermediate transfer belt contact is arranged on a downstream side of the intermediate transfer belt in a rotation direction of the intermediate transfer belt, and wherein $Rv>Rs1$ and $Rs2>Rs1$, and $Rs2/Rv \leq 40$ are satisfied where Rv (Ω) is a volume resistance value of the intermediate transfer belt in a thickness direction, Rs1 (Ω) is a first surface resistance value of the inner surface layer side in a surface direction, and Rs2 (Ω) is a second surface resistance value on the surface layer side in a surface direction.

Further features of the present disclosure will become apparent from the following description of exemplary embodiments with reference to the attached drawings.

DESCRIPTION OF THE EMBODIMENTS

Exemplary embodiments of the present disclosure will be described in detail with reference to the attached drawings. Note that dimensions, materials, and shapes of components, and relative arrangements thereof described in the following exemplary embodiments should be changed as appropriate depending on configurations and various conditions of apparatuses to which the present disclosure is applied, and not intended to limit the scope of the present disclosure within the following exemplary embodiments.

1. Image Forming Apparatus

Figure 1:
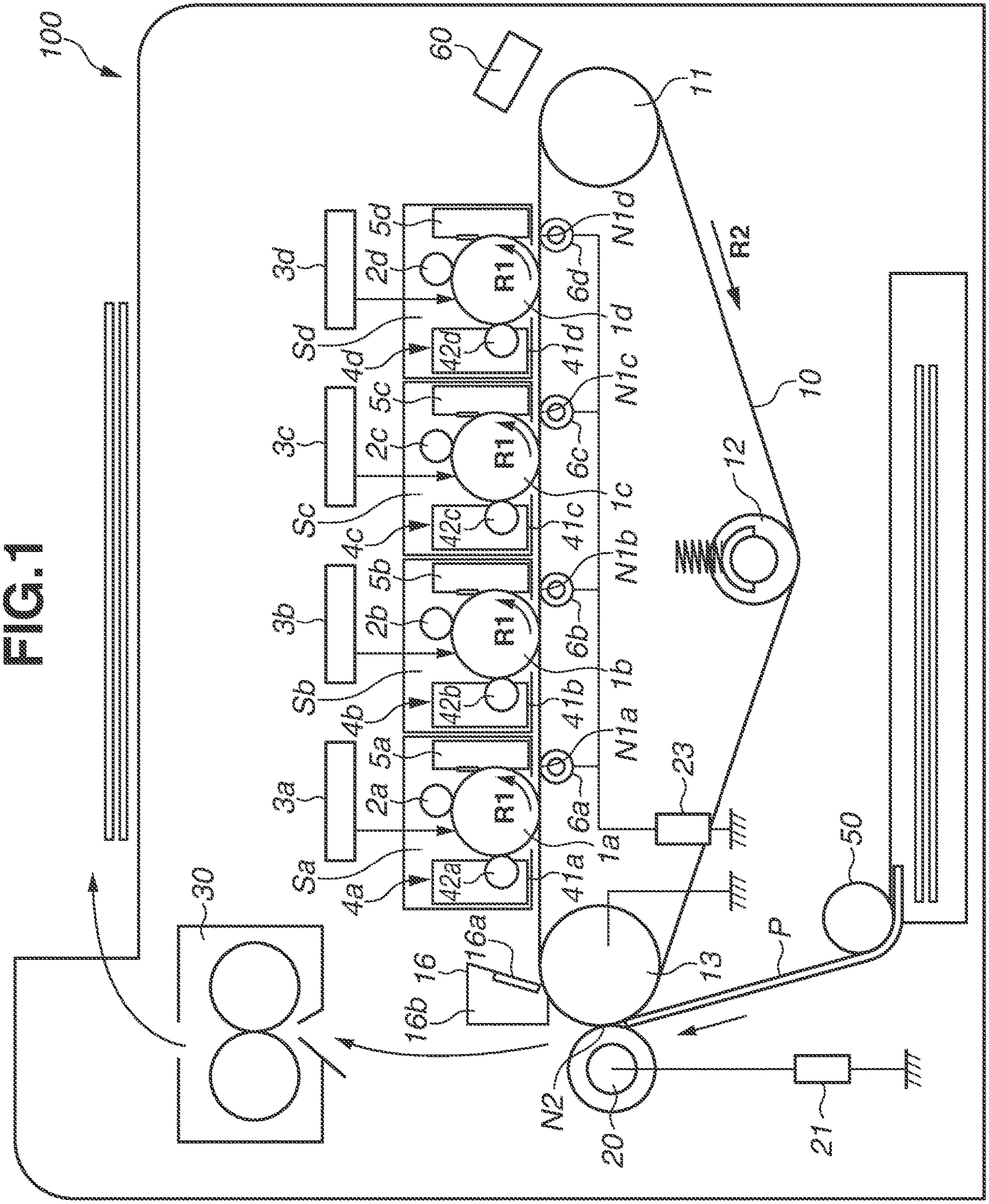
FIG. 1 is a cross-section diagram schematically illustrating an image forming apparatus according to a first exemplary embodiment of the present disclosure.

FIG. 1 a cross-section diagram schematically illustrating an image forming apparatus according to a first exemplary embodiment.

More specifically, FIG. 1 is a longitudinal section illustrating a configuration of an image forming apparatus 100 according to the present exemplary embodiment.

As illustrated in FIG. 1, the image forming apparatus 100 is a so-called tandem type image forming apparatus including a plurality of image forming units (stations) Sa, Sb, Sc, and Sd. The first image forming unit Sa, the second image forming unit Sb, the third image forming unit Sc, and the fourth image forming unit Sd form respective images using yellow (Y) toner, magenta (M) toner, cyan (C) toner, and black (Bk) toner.

These four image forming units Sa, Sb, Sc, and Sd are disposed in a line with predetermined intervals, and the image forming units Sa, Sb, Sc, and Sd have substantially the same configuration except for colors of stored toners. For this reason, the image forming apparatus 100 according to the first exemplary embodiment (also second exemplary embodiment and third exemplary embodiment) will be described mainly using the first image forming unit Sa.

The first image forming unit Sa includes a photosensitive drum 1*a*, which is a photosensitive member with a drum shape, a charging roller 2*a*, which is a charging member, a developing unit 4*a*, and a drum cleaning unit 5*a*.

The photosensitive drum 1*a* is an image bearing member for bearing a toner image, and is rotationally driven in an arrow R1 direction at a predetermined process speed (200 mm/sec in the first exemplary embodiment). The developing unit 4*a* includes a developer container 41*a* for containing yellow toner, and a developing roller 42*a* serving as a developing member for bearing the yellow toner supplied from the developer container 41*a* to develop a yellow toner image on the photosensitive drum 1*a*.

The drum cleaning unit 5*a* is a unit for collecting toner adhering to the photosensitive drum 1*a*. The drum cleaning unit 5*a* includes a cleaning blade to contact the photosensitive drum 1*a*, and a waste toner box for containing toner removed from the photosensitive drum 1*a* by the cleaning blade.

When a DC controller 274 (see FIG. 2) serving as a controller receives an image signal to start an image forming operation, the photosensitive drum 1*a* is rotationally driven. In a rotation process of the photosensitive drum 1*a*, the photosensitive drum 1*a* is uniformly charged by the charging roller 2*a* with a predetermined polarity (negative polarity in the first exemplary embodiment) at a predetermined potential (dark portion potential Vd), and is exposed by an exposure unit 3*a* based on the image signal.

In this way, an electrostatic latent image corresponding to a yellow color component image of a target color image is formed.

Next, the electrostatic latent image is developed by the developing roller 42*a* at a developing position, and is visualized as a yellow toner image (hereinbelow, just referred to as a toner image). The developing roller 42*a* rotates in the same direction as the photosensitive drum 1*a* at a speed of 300 mm/sec, which is 1.5 times that of the photosensitive drum 1*a* in speed, to perform development on the photosensitive drum 1*a* stably.

At this time, in the present exemplary embodiment, the normal charging polarity of the toner contained in the developing unit 4*a* is negative. The developing roller 42*a* performs reversal development of the electrostatic latent image by the toner charged with the same polarity as the photosensitive drum 1*a* charged by the charging roller 2*a*. However, the present disclosure is applicable to an image forming apparatus configured to perform normal development of an electrostatic latent image using the toner charged with a polarity opposite to the charging polarity of the photosensitive drum 1*a*.

An endless movable intermediate transfer belt 10 serving as an intermediate transfer member is arranged at a position to contact the photosensitive drums 1*a* to 1*d* of the image forming units Sa to Sd, and is stretched around three axes including a driving roller 11, a stretching roller 12, and a secondary transfer opposing roller 13 each serving as a stretching member. The intermediate transfer belt 10 is stretched with a total tensile force of 60 N by the stretching roller 12, and is moved in an arrow R2 direction by the rotation of the secondary transfer opposing roller 13 rotated by receiving a driving force.

The toner image formed on the photosensitive drum 1*a* is primarily transferred onto the intermediate transfer belt 10 by applying a voltage with a positive polarity from a primary transfer power source 23 to a primary transfer roller 6*a*, in a process in which the toner image passes through a primary transfer nip N1*a* at which the photosensitive drum 1*a* and the intermediate transfer belt 10 contact. Then, the toner remaining on the photosensitive drum 1*a* without being primarily transferred onto the intermediate transfer belt 10 is collected by the drum cleaning unit 5*a* to be removed from the surface of the photosensitive drum 1*a*.

In the present exemplary embodiment, at a primary transfer time, an electrical current is caused to flow from a contact member contacting the intermediate transfer belt 10 to the intermediate transfer belt 10. With this electrical current, a primary transfer potential is formed at the primary transfer portion of each of the image forming units Sa to Sd (image forming stations), of the intermediate transfer belt 10.

In addition, a generation method of the primary transfer potential of the image forming apparatus 100 according to the present exemplary embodiment will be described in detail below.

Similar to the yellow (first color) toner image, the magenta (second color) toner image, the cyan (third color) toner image, and the black (fourth color) toner image are formed and sequentially transferred onto the intermediate transfer belt 10 in an overlapped manner. In this way, four color toner images corresponding to a target color image are formed on the intermediate transfer belt 10. Then, the four color toner images born by the intermediate transfer belt 10 pass through a secondary transfer nip N2 formed by a secondary transfer roller 20 and the intermediate transfer belt 10 contacting each other. In a process of passing through the secondary transfer nip N2, the four color toner images are collectively secondarily transferred onto a transfer medium (recording medium) P such as a paper sheet or an overhead projector sheet fed from a paper feed unit 50.

The secondary transfer roller 20 is a roller with an external diameter of 18 mm, and formed of nickel-plated steel bar with an external diameter of 8 mm covered by a foamed sponge material that is adjusted to have a volume resistivity of $10^8$ Ω·cm and thickness of 5 mm mainly including nitrile-butadiene rubber (NBR) and epichlorohydrin rubber. In addition, the rubber hardness of the foamed sponge material is 30 degrees with a load of 500 g measured using an ASKER hardness meter C type. The secondary transfer roller 20 is in contact with an outer circumferential surface of the intermediate transfer belt 10 and forms the secondary transfer nip N2 by being pressed with a pressing force of 50 N to the secondary transfer opposing roller 13 disposed facing the secondary transfer roller 20 via the intermediate transfer belt 10.

The secondary transfer roller 20 is rotationally driven by the intermediate transfer belt 10 and a voltage is applied from a secondary transfer power source 21. Thereby, an electrical current flows from the secondary transfer roller 20 toward the secondary transfer opposing roller 13. In this way, the toner image born by the intermediate transfer belt 10 is secondarily transferred at the secondary transfer nip N2 to the transfer medium P.

When the toner image on the intermediate transfer belt 10 is secondarily transferred onto the transfer medium P, the voltage to be applied to the secondary transfer roller 20 from the secondary transfer power source 21 is controlled to cause the electrical current to flow constantly from the secondary transfer roller 20 toward the secondary transfer opposing roller 13 via the intermediate transfer belt 10. Further, the magnitude of the electrical current to perform the secondary transfer is determined in advance based on a surrounding environment, in which the image forming apparatus 100 is installed, and types of the transfer medium P.

The secondary transfer power source 21 is connected to the secondary transfer roller 20 to apply a transfer voltage to the secondary transfer roller 20. Further, the secondary transfer power source 21 can output a range of voltage from 100 V to 4000 V.

The transfer medium P onto which the toner image of four colors is transferred by the secondary transfer is then heated and pressed with a fixing unit 30. As a result, the four colors of toner are melted and mixed to be fixed onto the transfer medium P. On the other hand, the toner remaining on the intermediate transfer belt 10 after the secondary transfer is removed and cleaned by a belt cleaning unit 16 (collection unit) provided on the downstream side of the secondary transfer nip N2 in the moving direction of the intermediate transfer belt 10.

The belt cleaning unit 16 includes a cleaning blade 16*a* and a waste toner container 16*b*. The cleaning blade 16*a* serving as a contact member contacts an outer circumferential surface of the intermediate transfer belt 10 at a position facing the secondary transfer opposing roller 13, and the waste toner container 16*b* contains the toner collected by the cleaning blade 16*a*. Hereinbelow, the cleaning blade 16*a* is simply referred to as a blade 16*a*.

In the image forming apparatus 100 according to the first exemplary embodiment, a full color print image is formed as described above.

2. Control of Image Forming Operation

Next, control of the image forming operation according to the first exemplary embodiment will be described with reference to a control block diagram.

Figure 2:
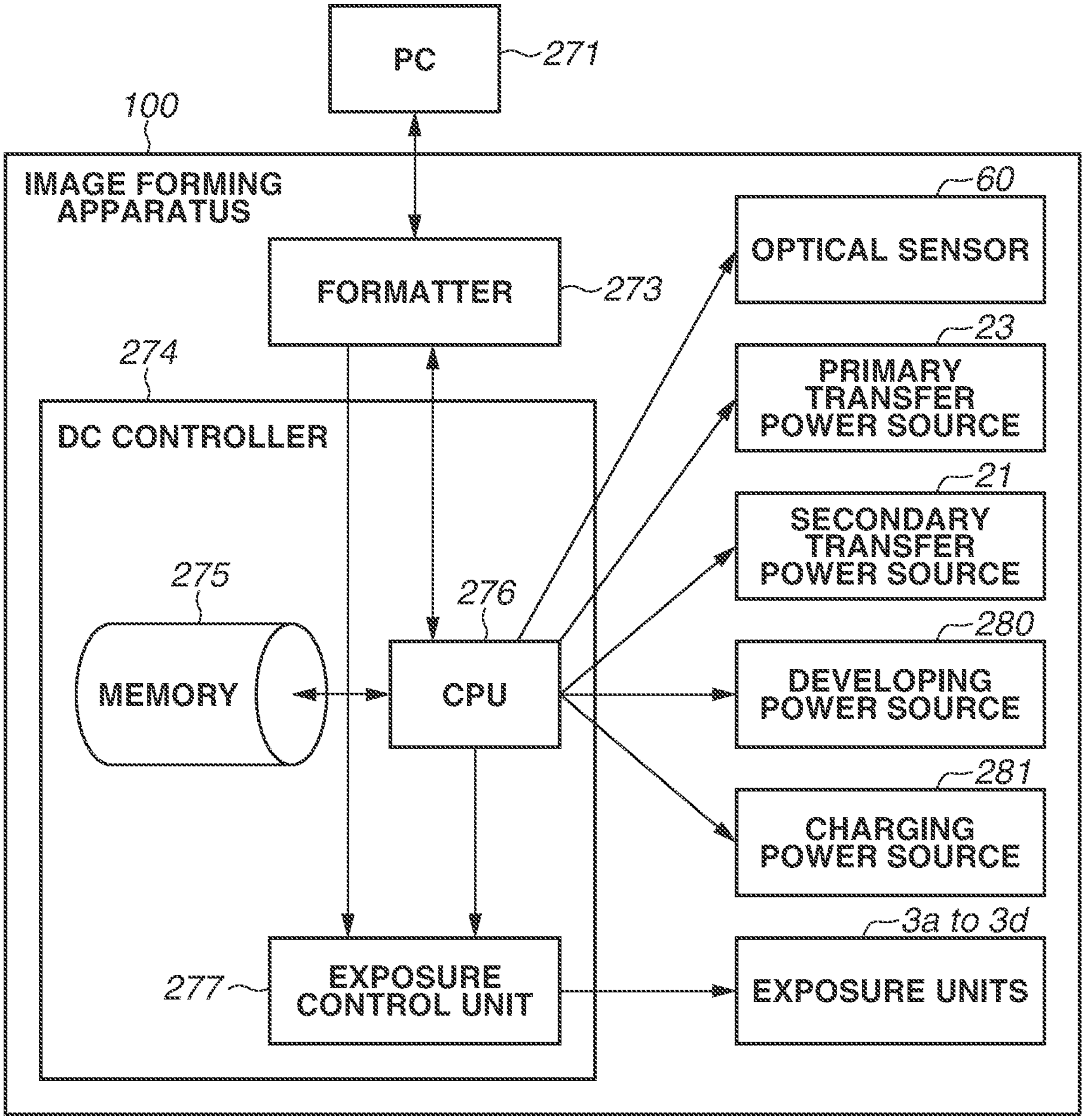
FIG. 2 is a control block diagram of the image forming apparatus according to the first exemplary embodiment of the present disclosure.

FIG. 2 is a block diagram illustrating control blacks of the image forming apparatus according to the first exemplary embodiment.

More specifically, FIG. 2 illustrates the control blocks for controlling the operation of the image forming apparatus 100.

As illustrated in FIG. 2, a personal computer (PC) 271 serving as a host computer issues a print instruction to a formatter 273 serving as a conversion unit included in the image forming apparatus 100 to transmit image data of a print image to the formatter 273.

The formatter 273 receives from the PC 271 red/green/blue (RGB) image data or cyan/magenta/yellow/black (CMYK) image data and converts the received image data into CMYK exposure data following the mode designated by the PC 271. The exposure data converted at this time has 600 dots per inch (dpi) resolution. The modes designated from the PC 271 include a mode regarding image quality, in addition to a paper type and a paper size.

On the other hand, the formatter 273 transfers the converted exposure data to an exposure control unit 277 serving as an exposure control device included in the DC controller 274. The exposure control unit 277 controls exposure units 3*a* to 3*d* following an instruction from a central processing unit (CPU) 276.

In the image forming apparatus 100 illustrated in FIG. 2, halftone control is performed by adjusting on and off areas of the exposure data. The CPU 276 starts an image forming sequence upon receiving the print instruction from the formatter 273.

The DC controller 274 includes the CPU 276, a memory 275, and the like, and performs a preprogrammed operation. The CPU 276 controls a charging high-voltage (charging power source 281), a developing high-voltage (developing power source 280), and a transfer high-voltage (primary transfer power source 23 and secondary transfer power source 21) to form an electrostatic latent image, and also controls a developed toner image transfer and the like to form an image.

Further, the CPU 276 also performs processing of receiving a signal from an optical sensor 60 serving as a detection unit used in a case where a correction control is performed to correct a position and a density of an image to be formed by the image forming apparatus 100. In the image correction control, an amount of reflection light reflected from a test patch (toner image used for detection) formed on an outer circumferential surface of the intermediate transfer belt 10 at a position facing the optical sensor 60 is measured by the optical sensor 60.

In addition, the detection signal detected by the optical sensor 60 is analog-to-digital (AD) converted via the CPU 276, and then stored in the memory 275. The DC controller 274 performs calculation using the detection result of the optical sensor 60 and performs various kinds of corrections.

3. Stretching Configuration for Intermediate Transfer Belt

Next, a description will be given of the intermediate transfer belt 10, and the driving roller 11, the stretching roller 12, and the secondary transfer opposing roller 13, which are stretching members for the intermediate transfer belt 10, and the primary transfer rollers 6*a* to 6*d*, used in the image forming apparatus 100 according to the present exemplary embodiment.

As illustrated in FIG. 1, the intermediate transfer belt 10 is arranged as an intermediate transfer member at a position facing each of the image forming units Sa to Sd. The intermediate transfer belt 10 is an endless belt formed by adding a conducting agent to a resin material to add conductivity thereto. The intermediate transfer belt 10 is stretched by three axes including the driving roller 11, the stretching roller 12, the secondary transfer opposing roller 13, which are the stretching members. In this way, the intermediate transfer belt 10 is stretched by the stretching roller 12 with a total tensile force of 60 N.

Further, as illustrated in FIG. 1, the primary transfer rollers 6*a* to 6*d* are disposed on the respective downstream sides of the photosensitive drums 1*a*, 1*b*, 1*c*, and 1*d* in a moving direction of the intermediate transfer belt 10. The primary transfer rollers 6*a* to 6*d* are contact members contacting the inner circumferential surface of the intermediate transfer belt 10.

Figure 3:
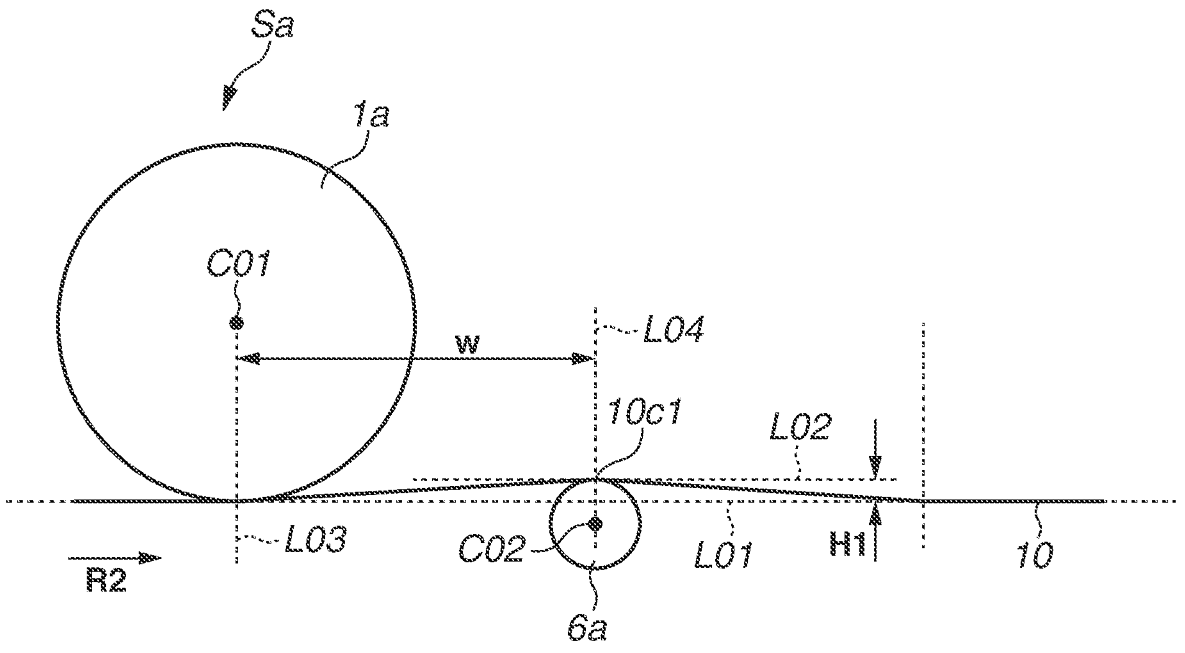
FIG. 3 is a cross-section diagram schematically illustrating a primary transfer portion of the image forming apparatus according to the first exemplary embodiment of the present disclosure.

FIG. 3 is a cross-section diagram schematically illustrating the primary transfer portion of the image forming apparatus 100 according to the present exemplary embodiment. Since the image forming units Sa, Sb, Sc, and Sd have substantially the same configuration, the image forming apparatus 100 according to the first exemplary embodiment will be described mainly using the first image forming unit Sa.

More specifically, FIG. 3 illustrates an arrangement relationship between the photosensitive drum 1*a* and the primary transfer roller 6*a*.

As illustrated in FIG. 3, in the image forming unit Sa, the primary transfer roller 6*a* is disposed on the downstream side of the photosensitive drum 1*a* in the rotation direction R2 of the intermediate transfer belt 10. More specifically, a perpendicular line L04 perpendicular to the intermediate transfer belt 10 is located on the downstream side of a perpendicular line L03 perpendicular to the intermediate transfer belt 10 in the rotation direction R2 of the intermediate transfer belt 10. The perpendicular line L04 passes through a rotation center C02 of the primary transfer roller 6*a*, and the perpendicular line L03 passes through a rotation center C01 of the photosensitive drum 1*a*.

Further, the primary transfer roller 6*a* is arranged at a position entering the surface of the intermediate transfer belt 10 so that a "wound amount" of the intermediate transfer belt 10 around the photosensitive drum 1*a* can be secured in the image forming unit Sa. In addition, a dotted line L01 in FIG. 3 illustrates a position of the surface of the intermediate transfer belt 10 before the primary transfer roller 6*a* enters the surface of the intermediate transfer belt 10. On the other hand, a dotted line L02 in FIG. 3 illustrates a position of a vertex 10*c*1 of the surface of the intermediate transfer belt 10 after the primary transfer roller 6*a* enters the surface of the intermediate transfer belt 10. In the present exemplary embodiment, the vertex 10*c*1 is a position at which the intermediate transfer belt 10 and the primary transfer roller 6*a* are brought into contact.

In the present exemplary embodiment, the primary transfer roller 6*a* is a metal roller configured of a straight nickel-plated round bar formed of Steel Use Stainless (SUS) with an external diameter of 6 mm. The primary transfer roller 6*a* is rotated along with the rotation of the intermediate transfer belt 10. On the other hand, in the first exemplary embodiment, an external diameter of the photosensitive drum 1*a* is 24 mm. The primary transfer roller 6*a* is in contact with the intermediate transfer belt 10 over a predetermined area in a lengthwise direction (width direction) orthogonal to the moving direction of the intermediate transfer belt 10.

In addition, the distance between the perpendicular line L03 drawn from the rotation center C01 of the photosensitive drum 1*a* and the perpendicular line L04 drawn from the rotation center C02 of the primary transfer roller 6*a* is defined as W, and a lifting height of the intermediate transfer belt 10 by the primary transfer roller 6*a* (i.e., distance between dotted lines L01 and L02) is defined as H1. At this time, in the first exemplary embodiment, W=10 mm and H1=2 mm.

In addition, a voltage is applied from the primary transfer power source 23 to the primary transfer roller 6*a*, and is supplied as a primary transfer current (described below) that passes through the inner circumferential surface conductive layer of the intermediate transfer belt 10. In the first exemplary embodiment, 300 V is applied as the primary transfer voltage.

4. Intermediate Transfer Belt

Next, the intermediate transfer belt 10, which is a feature point of the first exemplary embodiment, will be described.

Figure 4:
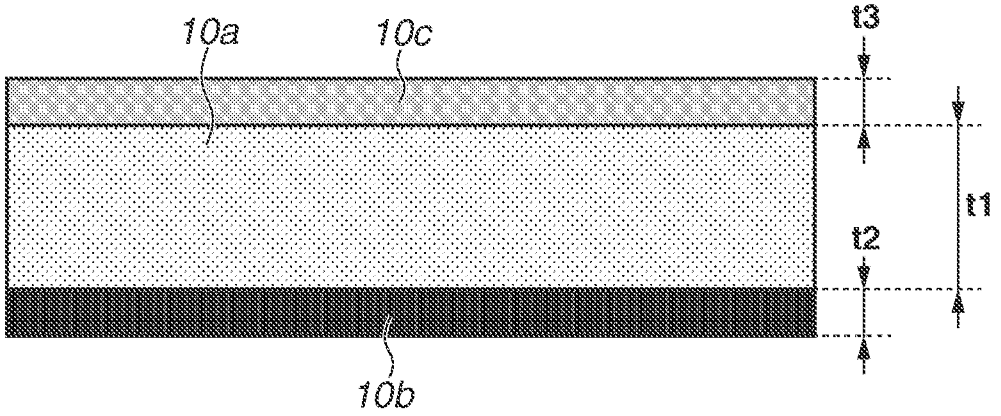
FIG. 4 is a cross-section diagram schematically illustrating an intermediate transfer belt of the image forming apparatus according to the first exemplary embodiment of the present disclosure.

FIG. 4 is a cross-section diagram schematically illustrating the intermediate transfer belt 10 of the image forming apparatus 100 according to the first exemplary embodiment.

More specifically, FIG. 4 illustrates a vertical cross-section view in a thickness direction of the intermediate transfer belt 10 used in the first exemplary embodiment.

In the present exemplary embodiment, the intermediate transfer belt 10 has a peripheral length of 700 mm and a thickness of 90 μm, and has a three-layer configuration including a base layer 10*a*, an inner surface layer 10*b* formed on an inner circumferential surface of the base layer 10*a*, and a surface layer 10*c* formed on an outer circumferential surface of the base layer 10*a*.

The base layer 10*a* is an endless layer formed of polyethylene naphthalate (PEN) with an ion conductive material mixed as a conducting agent. Further, the inner surface layer 10*b* is a layer formed of acrylic resin with carbon mixed as a conducting agent. The surface layer 10*c* is a layer formed of acrylic resin with metal oxide mixed as a conducting agent.

More specifically, the inner surface layer 10*b* is a layer formed on the inner side (stretching axis side) of the base layer 10*a*. Assuming that the polyvinylidene fluoride layer, which is the base layer 10*a*, is t1 in thickness, the acrylic resin layer, which is the inner surface layer 10*b*, is t2 in thickness, and the acrylic resin layer, which is the surface layer 10*c*, is t3 in thickness, t1=87 μm, t2=2 μm, and t3=3 μm.

In addition, in the present exemplary embodiment, PEN is used as the material of the base layer 10*a* of the intermediate transfer belt 10. However, other materials may be used. For example, a material such as polyester or acrylonitrile butadiene styrene (ABS) copolymer, or mixed resin thereof may be used.

Further, in the present exemplary embodiment, acrylic resin is used as the material of the inner surface layer 10*b* of the intermediate transfer belt 10. However, other materials may be used. For example, a material such as polyester may be used.

Further, in the present exemplary embodiment, acrylic resin is used as the material of the surface layer 10*c* of the intermediate transfer belt 10. However, other materials may be used. For example, a material such as polyester may be used.

In the present exemplary embodiment (experimental examples 1 to 9), a preferable resistance value of the intermediate transfer belt 10 is set as a resistance value of the intermediate transfer belt 10, using a volume resistivity measured from the surface layer 10*c* side, a surface resistivity measured from the surface layer 10*c* side, and a surface resistivity measured from the inner surface layer 10*b* side.

In addition, the volume resistivity is measured using a ring probe of type UR (MCP-HTP12) attached to Hiresta-UP (MCP-HT450) of Mitsubishi Chemical Corporation. As a probe opposing electrode, a metallic surface of a register table UFL is used.

On the other hand, the surface resistivity is measured using a ring probe of type UR 100 (MCP-HTP16) attached to a measurement device that is the same as that used for the volume resistivity. As a probe opposing electrode, a surface of polytetrafluoroethylene, such as a Teflon® surface, of a register table UFL is used.

Further, the measurement of the volume resistivity is performed under the conditions that the probe presses from the front surface side of the intermediate transfer belt 10 with a pressing force 1 kg, an application voltage is 250 V, and a measurement time is 10 s. The measurement of the volume resistivity is a measurement of a resistance value of the intermediate transfer belt 10 in a thickness direction, and corresponds to the measurement of a resistance value of the base layer 10*a*. If the application voltage is too high, it is hard to detect the change of the volume resistivity. On the other hand, if the application voltage is too low, the repetitive reproducibility of the measured value decreases due to the influence of the surface shape of the surface layer 10*c* or the influence of the foreign substances adhering to the probe.

Taking these conditions into consideration, the application voltage is determined to be 250 V in the first exemplary embodiment.

The measurement of the surface resistivity of the inner surface layer 10*b* is performed under the conditions that the probe presses from the inner surface side of the intermediate transfer belt 10 with a pressing force 1 kg, an application voltage is 10 V, and a measurement time is 10 s.

Further, the measurement of the surface resistivity of the surface layer 10*c* is performed under the conditions that the probe presses from the inner surface side of the intermediate transfer belt 10 with a pressing force 1 kg, an application voltage is 100 V, and a measurement time is 10 s.

The measurement of the surface resistivity of the surface layer 10*c* corresponds to the measurement of a resistance value of the surface layer 10*c*. If the application voltage is too high, the amount of current passing through the base layer 10*a* and the inner surface layer 10*b* increases. On the other hand, if the application voltage is too low, there may be a case where a resistance value cannot be measured because current does not flow between the probe electrodes, and a case where the repetitive reproducibility of the measured value decreases due to the influence of the surface shape of the surface layer 10*c* or the influence of foreign substances adhering to the probe. For this reason, the application voltage is determined to be 100 V in the first exemplary embodiment, taking these conditions into consideration.

In addition, in the present exemplary embodiment, the indoor temperature is set to 23° C. and the indoor humidity is set to 50% as a measurement environment of the resistance value.

The above-described "volume resistivity" and "surface resistivity" are defined by Japanese Industrial Standards (JIS) K 6911, and are expressed by the following formulas (1) and (2).

$$\text{volume resistivity } \rho v\ (\Omega\cdot\text{cm})=R(\Omega)\times RCFv\times t\ (\text{cm}) \quad (1)$$

$$\text{surface resistivity } \rho s(\Omega/\text{square})=R(\Omega)\times RCFs \quad (2)$$

RCFv in the formula (1) and RCFs in the formula (2) are resistivity correction coefficients and are constants set for each probe used for measurement.

In the present exemplary embodiment, a ring probe of type UR (MCP-HTP12) is used to measure the "volume resistivity", and RCFv is 2.011 in this case.

Further, a ring probe of type UR100 (MCP-HTP16) is used to measure the "surface resistivity", and RCFs is 100 in this case.

Further, "t" in the formula (1) is a thickness of the intermediate transfer belt 10.

In the present exemplary embodiment, the resistance values calculated from the formulas (1) and (2) will be described to compare resistance values (R) in a thickness direction and a surface direction.

In the following description, a resistance value obtained by converting the volume resistivity (ρv) using the formula (1) is referred to as a "volume resistance value (Rv)", and a resistance value obtained by converting the surface resistivity (ρs) using the formula (2) is referred to as a surface resistance value (Rs). In an experimental example 1 of the first exemplary embodiment, as described in a table 1 below, the intermediate transfer belt 10 has $1.62\times10^{7}$ (Ω) as the volume resistance value, $1.10\times10^{5}$ (Ω) as the surface resistance value of the inner surface layer 10*b*, and $3.55\times10^{7}$ (Ω) as a surface resistance value of the surface layer 10*c*. Accordingly, in the "experimental example 1", assuming that the volume resistance value is Rv, the surface resistance value of the inner surface layer 10*b* is Rs1, and the surface resistance value of the surface layer 10*c* is Rs2, the value of Rs1 is lower than the values of Rv and Rs2, and Rs2/Rv is 2.19.

Next, with reference to FIGS. 5A and 5B, a description will be given of a reason why the surface resistance value Rs1 of the inner surface layer 10*b* is set to be lower than, for example, the surface resistance value Rs2 of the surface layer 10*c*, in the present exemplary embodiment.

Figure 5A:
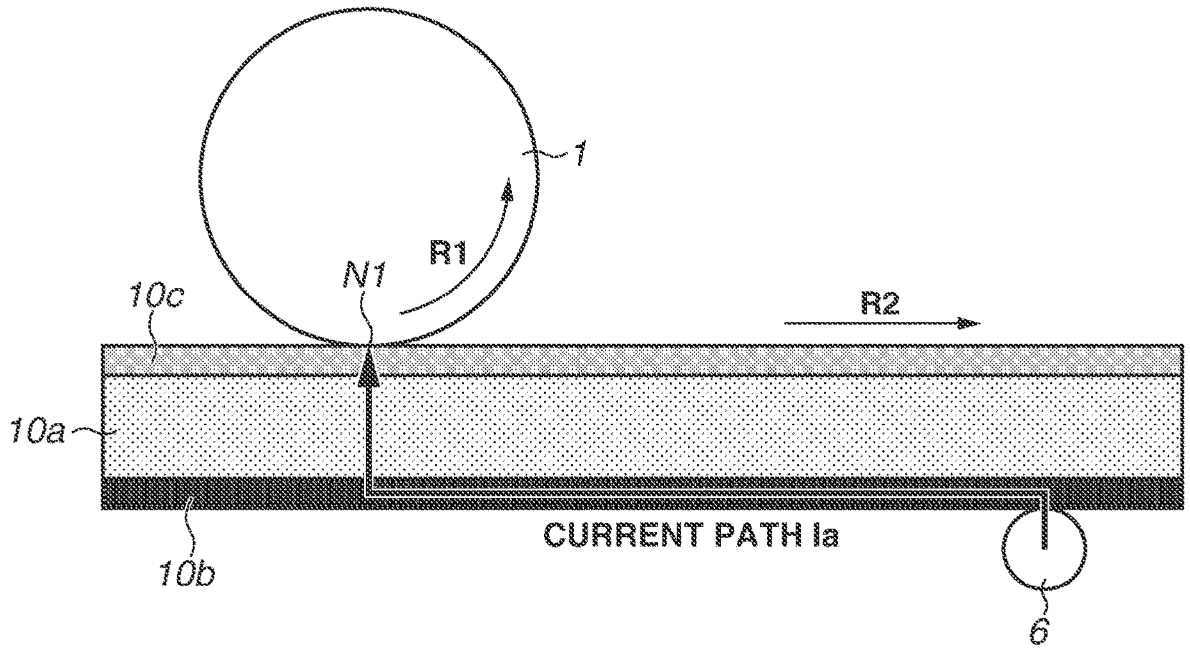
FIGS. 5A and 5B are diagrams schematically illustrating primary transfer current paths Ia and Ib of the image forming apparatus according to the first exemplary embodiment of the present disclosure, respectively.
Figure 5B:
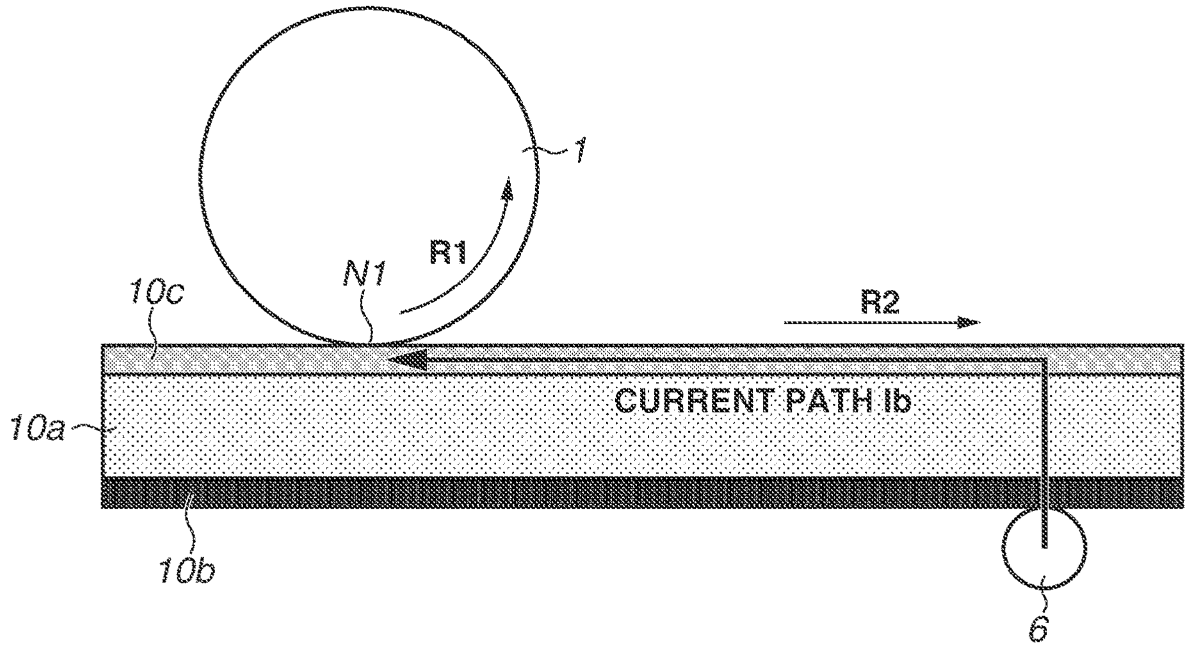

FIGS. 5A and 5B are respective schematic diagrams illustrating a primary transfer current path Ia and a primary transfer current path Ib of the image forming apparatus 100 according to the first exemplary embodiment of the present disclosure.

More specifically, FIGS. 5A and 5B schematically illustrate a state where the current supplied from the primary transfer roller 6 flows in two different current paths including the current path Ia and the current path Ib.

As illustrated in FIG. 5A, in the current path Ia, the primary transfer current supplied from the primary transfer roller 6 flows mainly in the inner surface layer 10*b* in an opposite direction of the rotation direction R2 of the intermediate transfer belt 10. Further, the primary transfer current reaches the primary transfer nip N1 that is a contact point of the photosensitive drum 1 and the intermediate transfer belt 10, and flows to the photosensitive drum 1.

On the other hand, as illustrated in FIG. 5B, as for the current path Ib, the primary transfer current flows mainly in the surface layer 10*c*. More specifically, in a case where the inner surface layer 10*b*, the base layer 10*a*, and the surface layer 10*c* have similar resistance values, the primary transfer current passes through the base layer 10*a* or the surface layer 10*c* as a current path from the primary transfer roller 6 to the primary transfer nip N1.

In this case, in a case of the "current path Ib" as illustrated in FIG. 5B, the surface layer 10*c* has a positive polarity and there is a possibility that discharge current may be generated between the intermediate transfer belt 10 and the photosensitive drum 1 on the downstream side of the primary transfer nip N1 in the direction R2. As a result, there is a possibility that an image defect with a discharge pattern may occur in the corresponding image forming unit at a transfer time, or a so-called "re-transfer" may occur. The re-transfer is a phenomenon in which toner primarily transferred onto the intermediate transfer belt 10 is transferred onto the photosensitive drum 1 at the station disposed on the downstream side of the intermediate transfer belt 10 in the rotation direction R2.

Accordingly, it is necessary to bypass the "current path Ib" illustrated in FIG. 5B to suppress the discharge current generated on the downstream side of the primary transfer nip N1 in the direction R2, and to prevent the re-transfer. Thus, in the present exemplary embodiment, the resistance value of the inner surface layer 10*b* is made sufficiently smaller than those of the base layer 10*a* and the surface layer 10*c* to achieve a configuration in which the primary transfer current mainly passes through the inner surface layer 10*b* to reach the primary transfer nip N1. In other words, the "current path Ia" illustrated in FIG. 5A is achieved.

Next, a preferable relationship between the volume resistance value Rv and the surface resistance value Rs2 on the surface layer 10*c* side will be described.

Figure 6:
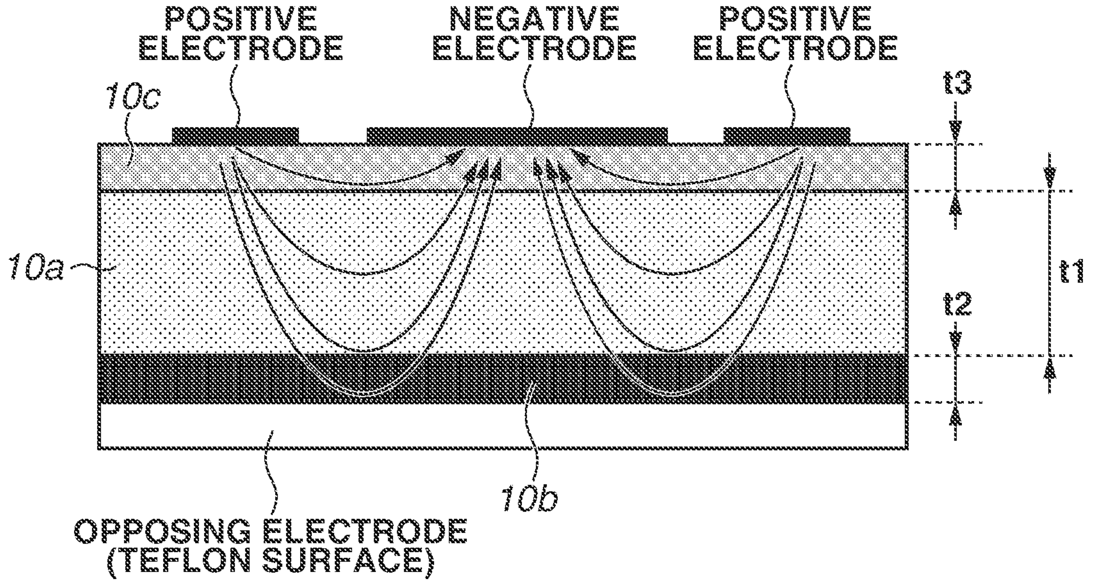
FIG. 6 is diagram schematically illustrating a current path when a surface resistivity on a surface side of the intermediate transfer belt of the image forming apparatus according to the first exemplary embodiment of the present disclosure is measured.

FIG. 6 is diagram schematically illustrating a current path when the surface resistance value Rs2 on the surface layer

10*c* side of the intermediate transfer belt 10 of the image forming apparatus 100 according to the first exemplary embodiment is measured.

As illustrated in FIG. 6, the surface resistance value Rs2 on the surface layer 10*c* side is obtained by measuring a current flowing from a positive electrode to a negative electrode contacting the surface layer 10*c*.

Since the thickness "t3" of the surface layer 10*c* is thin (3 μm), when the surface resistance value Rs2 of the surface layer 10*c* is measured, the current flowing between the electrodes of the probe also passes through the base layer 10*a* in addition to the surface layer 10*c* to reach the negative electrode from the positive electrode. Further, since the intermediate transfer belt 10 according to the first exemplary embodiment includes the inner surface layer 10*b*, part of the current flowing between the electrodes of the probe passes through the inner surface layer 10*b*. As a result, the surface resistance value Rs2 of the surface layer 10*c* is measured as if it is lower than the actual resistance value.

In a case where the surface resistance value Rs2 of the surface layer 10*c* is high, for example, when a voltage is applied to the secondary transfer roller 20, a discharge current may be generated between the secondary transfer roller 20 and the intermediate transfer belt 10, influenced by the pattern of the toner image or the unevenness of the paper. With the discharge current, electric charge is accumulated on the surface layer 10*c* of the intermediate transfer belt 10 to form a potential as a potential memory. In this way, the potential may be held on the surface layer 10*c*. If a primary transfer is performed in this state, a discharge current is generated between the photosensitive drum 1 and the intermediate transfer belt 10 on the upstream side of the primary transfer nip N1 in the rotation direction R2 of the intermediate transfer belt 10.

With this discharge current, a phenomenon called pre-transfer occurs. This phenomenon is a phenomenon in which the primary transfer toner on the photosensitive drum 1 is transferred onto the intermediate transfer belt 10 at a gap between the photosensitive drum 1 and the intermediate transfer belt 10 on the upstream side of the primary transfer nip N1. Due to such a primary transfer failure, an image defect, in which a formed image is deteriorated in quality or a discharge trail is formed as a toner image, may occur.

In the present exemplary embodiment, to prevent such a primary transfer failure, the surface resistance value Rs2 of the surface layer 10*c* of the intermediate transfer belt 10 was studied so as to have a preferable surface resistance value, taking into consideration the amount of passing current into the inner surface layer 10*b*. Further, since the preferable primary transfer voltage changes depending on the volume resistance value, the surface resistance value Rs2 of the surface layer 10*c* is set so as to be able to suppress the image defect caused by the above-described discharge current, taking the volume resistance value into consideration.

<Evaluation>

Next, an evaluation about the first exemplary embodiment will be described.

The table 1 describes comparison results of experimental examples 1 to 9 according to the first exemplary embodiment and comparative examples 1 to 6 for the first exemplary embodiment obtained by changing the volume resistance value Rv and the surface resistance value Rs2 of the surface layer 10*c* of the intermediate transfer belt 10 used in the first exemplary embodiment.

More specifically, the table 1 includes the volume resistance value Rv, the surface resistance value Rs1 of the inner surface layer side, the surface resistance value Rs2 on the surface layer side, Rs2/Rv, and image evaluation results of (A) to (F), for each of the intermediate transfer belts 10 of the experimental examples 1 to 9 and the comparative examples 1 to 6.

In addition, the comparative examples 1 to 6 are different from the experimental examples 1 to 9 only in resistance value of the intermediate transfer belt 10 of the first exemplary embodiment, and other configurations are the same as those of the experimental examples 1 to 9.

The intermediate transfer belts 10 in the experimental examples 1 to 9 of the first exemplary embodiment and the comparative examples 1 to 6 have the same materials and shapes in the base layer 10*a*, the inner surface layer 10*b*, and the surface layer 10*c*. The resistance values thereof are adjusted by adjusting the amounts of conducting agents to be added to respective layers.

Next, with reference to the table 1, a description will be given of the evaluation of the "image quality" of each of the evaluation images (A) to (F) according to the first exemplary embodiment.

The table 1 includes resistance values of intermediate transfer belts 10 in the experimental examples 1 to 9 according to the first exemplary embodiment and the comparative examples 1 to 6, measured in the ambient temperature 23° C. and the humidity 50%, and the transferability of the image formed in the ambient temperature 23° C. and the humidity 50% at the primary transfer portion for each of the intermediate transfer belts 10.

In addition, for the "evaluation images (A) to (E)" illustrated in the table 1, A4 size sheets GF-0081 (produced by CANON) of 81.4 g/$m^2$ in grammage are used.

More specifically, as the evaluation image (E), a full-page solid (Solid in the table 1) image with an average density of 100% of yellow, magenta, cyan, and black is printed and evaluated.

Further, as the evaluation image (D), a solid patch image with 10 mm×10 mm square patches for each color being discretely arranged is printed and evaluated.

Further, as the evaluation images (B) and (C), respective full-page halftone (HT in the table 1) images with average densities of 20% and 50% are printed and evaluated.

Further, as the evaluation image (F), an full-page ary (secondary) color (Ary Color in the table 1) image of red, green, blue with an average density 200% is printed and evaluated.

Further, as the evaluation image (A), a text image including yellow, magenta, cyan, black texts each with an average density 100% is printed and evaluated.

First, the evaluation results of the experimental examples 1 to 9 of the intermediate transfer belts 10 according to the first exemplary embodiment will be described.

As illustrated in the table 1, in the present exemplary embodiment, the volume resistance value Rv of the intermediate transfer belt 10 of each of the experimental examples 1 to 9 resides in a range from $2.60\times10^6$ (Ω) to $3.51\times10^7$ (Ω), and the surface resistance value Rs1 of the inner surface layer 10*b* resides in a range from $1.10\times10^3$ (Ω) to $1.10\times10^5$ (Ω).

In the present exemplary embodiment, the surface resistance value Rs2 of the surface layer 10*c* of the intermediate transfer belt 10 of each of the experimental examples 1 to 9 resides in a range from $3.55\times10^7$ (Ω) to $6.41\times10^8$ (Ω), and Rs2/Rv resides in a range from 2.186 to 38.740.

On the other hand, the volume resistance value Rv of the intermediate transfer belt 10 of each of the comparative examples 1 to 5 resides in a range from $1.56\times10^6$ (Ω) to $1.42\times10^8$ (Ω), and the surface resistance value Rs1 of the inner surface layer 10$b$ is $1.10\times10^5$ (Ω). The surface resistance value Rs2 of the surface layer 10$c$ of the intermediate transfer belt 10 of each of the comparative examples 1 to 5 resides in a range from $1.23\times10^8$ (Ω) to $6.04\times10^{10}$ (Ω), and Rs2/Rv resides in a range from 53.564 to 424.523.

Further, in the intermediate transfer belt 10 of the comparative example 6, the volume resistance value Rv is $1.98\times10^6$ (Ω), the surface resistance value Rs1 of the inner surface layer 10$b$ is $1.10\times10^5$ (Ω), the surface resistance value Rs2 of the surface layer 10$c$ is $2.18\times10^6$, and Rs2/Rv is 1.103.

As illustrated in the table 1, an image defect (evaluation result "NG") is not observed for each of the evaluation images (A) to (F) of the experimental examples 1 to 9 according to the first exemplary embodiment. In the table 1, "AA" means excellent, "A" means good, "B" means small image defect, and "NG" means image defect.

Next, a description will be given of a reason why excellent images can be obtained in the intermediate transfer belts 10 of the experimental examples 1 to 9 according to the first exemplary embodiment.

First, the excellent images were obtained even for the full-page halftone 20% image (B) and the full-page halftone 50% image (C) in which the discharge images are easily noticed, because the intermediate transfer belts 10 are configured not to have excessively high surface resistance values on the surface layer 10$c$ side, taking the fact that the inner surface layer 10$b$ is formed into consideration.

On the other hand, by setting the volume resistance value Rv and the surface resistance value Rs2 of the surface layer 10$c$ to have close values, even if a primary transfer voltage enough to obtain a desired primary transfer current is applied, a potential memory phenomenon of the surface layer 10$c$ does not occur and the discharge current on the upstream side of the primary transfer nip N1 is suppressed. More specifically, if $Rs2/Rv \leq 40$ is satisfied, the volume resistance value Rv and the surface resistance value Rs2 of the surface layer 10$c$ becomes close to each other, to effectively suppress the discharge current. Further, since the surface resistance value Rs1 on the inner surface layer 10$b$ side is set to be sufficiently small, the primary transfer voltage applied to the primary transfer roller 6 hardly attenuated before reaching the primary transfer nip N1. Thus, the excellent transferability was obtained even for the images that need sufficient transfer currents, such as the full-page solid image (E) and the full-page secondary color image (F).

Further, since the surface resistance value Rs2 of the surface layer 10$c$ is high, also in the solid patch image (D), it was possible to restrain the occurrence of the transfer failure generated due to a reason that the primary transfer current does not pass through the solid patch image to be described below.

In addition, since the potential memory phenomenon of the surface layer 10$c$, in general, tends to occur easily, as the surface resistance value Rs2 of the surface layer 10$c$ becomes larger, it is preferable to set the surface resistance value Rs2 to be $1.00\times10^9$ (Ω) or lower, in the present exemplary embodiment. Further, it is more preferable to set the surface resistance value Rs2 of the surface layer 10$c$ to be $6.41\times10^8$ (Ω) or lower, to reduce the influence of the potential memory phenomenon.

Next, evaluation results of the intermediate transfer belts 10 in the comparative examples 1 to 5 will be described.

The intermediate transfer belt 10 of the comparative example 1 has a high surface resistance value Rs2 of the surface layer 10$c$ relative to the volume resistance value Rv, and the value of Rs2/Rv is 53.564. With the intermediate transfer belt 10 of the comparative example 1, a minor discharge trail was observed on each of the images of full-page halftone 20% image (B) and the full-page halftone 50% image (C), which are images for which a discharge trail is easy to be noticed, as a result of the occurrence of the potential memory phenomenon of the surface layer 10$c$.

Further, the intermediate transfer belt 10 of each of the comparative examples 2 and 3 has a value of Rs2/Rv in a range from 120.001 to 195.914 and larger than that of the comparative example 1, and the potential memory phenomenon of the surface layer 10$c$ may occur more easily.

As a result, the discharge trails were easier to be noticed in the comparative examples 2 and 3, and a minor discharge trail was observed on the full-page halftone 20% image (B), and a noticeable discharge trail was observed on the full-page halftone 50% image (C).

Further, each of the intermediate transfer belts 10 in the comparative examples 4 and 5 has a value of Rs2/Rv in a range from 408.413 to 424.523, which is larger than that of the comparative examples 2 and 3, and a minor discharge trail was observed on the full-page halftone 20% image (B), and a noticeable discharge trail was observed on the full-page halftone 50% image (C) and the full-page solid image (E).

On the other hand, with the intermediate transfer belt 10 of the comparative example 6, a transfer failure caused by the toner image on the photosensitive drum 1 not being sufficiently transferred onto the intermediate transfer belt 10 due to the lack of the primary transfer current on the solid patch image (D), was generated.

More specifically, the intermediate transfer belt 10 of the comparative example 6 has 1.103 as a value of Rs2/Rv, the surface resistance value Rs2 on the surface layer 10$c$ side is almost equivalent to the volume resistance value Rv, and the surface resistance value Rs2 on the surface layer 10$c$ side is low like $2.18\times10^6$ (Ω), even though the potential memory phenomenon of the surface layer 10$c$ does not occur. Compared with the comparative example 6, any of the experimental examples 1 to 9 according to the first exemplary embodiment has $3.00\times10^7$ (Ω) or more as the surface resistance value Rs2. Thus, no image defect was observed on the solid patch image (D) without lack of the primary transfer current.

Next, in the intermediate transfer belt 10 of the comparative example 6, a description will be given of a mechanism in which the transfer failure occurs on the solid patch image (D) in a case where the surface resistance value Rs2 on the surface layer 10$c$ side is small.

Figure 7:
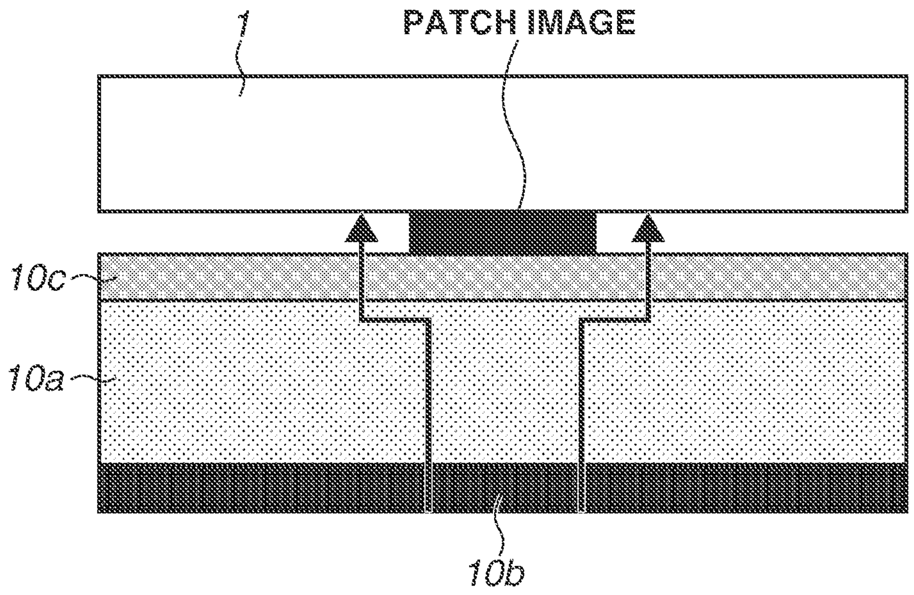
FIG. 7 is a diagram schematically illustrating a primary transfer current path in a comparative example 6 relative to the first exemplary embodiment of the present disclosure.

FIG. 7 is a diagram schematically illustrating a primary transfer current path in the comparative example 6 relative to the first exemplary embodiment according to the present disclosure.

More specifically, FIG. 7 illustrates a state of current at the primary transfer in the configuration of the comparative example 6.

In addition, the direction from the front side to the back side in FIG. 7 corresponds to the rotation direction R2 of the intermediate transfer belt 10.

As illustrated in FIG. 7, with the intermediate transfer belt 10 of the comparative example 6, the surface resistance value Rs2 of the surface layer 10$c$ is small, and the primary transfer current easily flows to the photosensitive drum 1 bypassing the patch image.

More specifically, as a current path of the primary transfer current, there is a path through which a primary transfer current flows to the photosensitive drum 1 from the intermediate transfer belt 10 through the toner image. On the other hand, as illustrated in FIG. 7, there is another path through which a primary transfer current directly flows to the photosensitive drum 1 from the intermediate transfer belt 10 not through the toner image. In the configuration illustrated in FIG. 7, the path through which a current flows through (passing through) the toner image normally has a larger resistance value than the path not through the toner image.

However, in a case where the surface resistance value Rs2 of the surface layer 10*c* is small, the difference of the resistance values between the current path through the toner image and the current path not through the toner image becomes large. For this reason, as illustrated in FIG. 7, in the comparative example 6, a large amount of the primary transfer current flows directly from the intermediate transfer belt 10 to the photosensitive drum 1 not through the toner image.

Thus, since the primary transfer is performed by the toner image being moved on the current passing path, with the configuration illustrated in the comparative example 6, if the ratio of the current flowing through the path not via the toner image increases, a sufficient amount of the transfer current cannot be supplied to the toner image, which may cause the transfer failure.

In addition, as for the text image (A), no image defect was observed in any of the intermediate transfer belts 10 of the experimental examples 1 to 9 according to the first exemplary embodiment and the comparative examples 1 to 6.

As described above, with the intermediate transfer belt 10 configured of three layers including the base layer 10*a*, the inner surface layer 10*b*, and the surface layer 10*c*, to obtain a good transferability, the primary transfer current supplied from the primary transfer roller 6 needs to reach the primary transfer nip N1 through the inner surface layer 10*b*. In addition, it is necessary to adjust the resistance values of the base layer 10*a* and the surface layer 10*c* to have a specific relationship so as to restrain the discharge trail and the pre-transfer to obtain good transferability.

More specifically, in the present exemplary embodiment, the volume resistance value Rv of the base layer 10*a* of the intermediate transfer belt 10, and the surface resistance value (second surface resistance value) Rs2 of the surface layer 10*c* need to be larger than the surface resistance value (first surface resistance value) Rs1 of the inner surface layer 10*b*. In addition, Rs2/Rv≤40 needs to be satisfied, and the surface resistance value (second surface resistance value) Rs2 needs to be $3.00\times10^7$ (Ω) or more.

In the present exemplary embodiment, as illustrated in the table 1, each of the volume resistance values Rv was set to be a value in a range from $2.60\times10^6$ (Ω) to $3.51\times10^7$ (Ω) as the resistance values of the intermediate transfer belts 10 of the experimental examples 1 to 9 according to the first exemplary embodiment. In other words, it is preferable to set the volume resistance value Rv in this range. In addition, it is more preferable to set the volume resistance value Rv to a value in a range from $4.57\times10^6$ (Ω) to $1.83\times10^7$ (Ω).

Further, in the present exemplary embodiment, the surface resistance value Rs1 of the inner surface layer 10*b* is set to be a value in a range from $1.10\times10^3$ (Ω) to $1.10\times10^5$ (Ω). In other words, the surface resistance value Rs1 of the inner surface layer 10*b* is desirably set in this range.

Thus, in the present exemplary embodiment, the surface resistance value Rs2 of the surface layer 10*c* is set to be a value in a range from $3.55\times10^7$ (Ω) to $6.41\times10^8$ (Ω). In other words, the surface resistance value Rs2 of the surface layer 10*c* is desirably set to be $3.55\times10^7$ (Ω) or more. On the other hand, considering the influence of the potential memory, the surface resistance value Rs2 of the surface layer 10*c* is desirably set to be $6.41\times10^8$ (Ω) or smaller.

Further, in the present exemplary embodiment, Rs2/Rv is set to be a value in a range from 2.186 to 38.740. Thus, Rs2/Rv≤40 is satisfied.

In this way, according to the present exemplary embodiment, it is possible to restrain the potential memory phenomenon of the surface layer 10*c* while a sufficient primary transfer voltage to perform the primary transfer is applied by setting Rv, Rs1, and Rs2 as described above, to obtain the intermediate transfer belt 10 for obtaining a good image quality with the discharge trail and the density unevenness caused by the pre-transfer being suppressed.

On the other hand, with the intermediate transfer belt 10 of each of the comparative examples 1 to 6, Rs2/Rv is 53.564 or more, and the image defect caused by the discharge trail of the intermediate transfer belt 10 was observed.

In order to restrain the potential memory phenomenon of the surface layer 10*c*, the surface resistivity ρs2 on the surface layer 10*c* side is desirably smaller than those of other layers, and Rs2/Rv needs to be 40 or smaller. In addition, it is preferable to set Rs2/Rv to be 21.859 or smaller, in order to effectively restrain the occurrence of the image defect under the condition in which the image defect due to the discharge trail is easy to occur, for example, when the usage environment at the image forming time is in low-temperature and low-humidity, or toner deteriorates. The reason is, as the Rs2/Rv is larger, the potential memory phenomenon of the surface layer 10*c* tends to occur more easily.

Further, as is understood from the comparative example 6, in order to effectively restrain the occurrence of the primary transfer failure for the solid patch image (D), it is necessary to reduce the resistance value difference between the resistance value of the current path formed from the intermediate transfer belt 10 to the photosensitive drum 1, and the resistance value of the current path formed from the intermediate transfer belt 10 to the photosensitive drum 1 via the toner image. Thus, in the present exemplary embodiment, the surface resistance value Rs2 on the surface layer 10*c* side is to be set $3.00\times10^7$ (Ω) or more.

TABLE 1

| | Rv (Ω) | Rs1 (Ω) | Rs2 (Ω) | Rs2/Rv | (A) Text | (B) HT (20%) | (C) HT (50%) | (D) Solid Patch | (E) Solid | (F) Ary Color |
|---|---|---|---|---|---|---|---|---|---|---|
| Experimental Example 1 | $1.62\times10^7$ | $1.10\times10^5$ | $3.55\times10^7$ | 2.1859 | AA | AA | AA | A | AA | AA |
| Experimental Example 2 | $1.66\times10^7$ | $1.10\times10^4$ | $7.36\times10^7$ | 4.4442 | AA | AA | AA | AA | AA | AA |
| Experimental Example 3 | $5.13\times10^6$ | $1.10\times10^5$ | $3.55\times10^7$ | 6.9123 | AA | AA | AA | A | AA | AA |

TABLE 1-continued

| | Rv (Ω) | Rs1 (Ω) | Rs2 (Ω) | Rs2/Rv | (A) Text | (B) HT (20%) | (C) HT (50%) | (D) Solid Patch | (E) Solid | (F) Ary Color |
|---|---|---|---|---|---|---|---|---|---|---|
| Experimental Example 4 | $4.57 \times 10^6$ | $1.10 \times 10^4$ | $4.00 \times 10^7$ | 8.7435 | AA | AA | AA | A | AA | AA |
| Experimental Example 5 | $9.15 \times 10^6$ | $1.10 \times 10^5$ | $1.00 \times 10^8$ | 10.9293 | AA | AA | AA | AA | AA | AA |
| Experimental Example 6 | $2.60 \times 10^6$ | $1.10 \times 10^5$ | $3.77 \times 10^7$ | 14.4828 | AA | A | AA | A | AA | AA |
| Experimental Example 7 | $3.51 \times 10^7$ | $1.10 \times 10^3$ | $6.41 \times 10^8$ | 18.2440 | AA | A | A | A | AA | AA |
| Experimental Example 8 | $1.62 \times 10^7$ | $1.10 \times 10^5$ | $3.55 \times 10^8$ | 21.8587 | AA | A | A | A | AA | AA |
| Experimental Example 9 | $9.16 \times 10^6$ | $1.10 \times 10^5$ | $3.55 \times 10^8$ | 38.7397 | AA | A | A | A | A | A |
| Comparative Example 1 | $2.29 \times 10^6$ | $1.10 \times 10^5$ | $1.23 \times 10^8$ | 53.5639 | AA | B | B | A | A | A |
| Comparative Example 2 | $2.47 \times 10^6$ | $1.10 \times 10^5$ | $2.97 \times 10^8$ | 120.0006 | AA | B | NG | A | A | A |
| Comparative Example 3 | $1.95 \times 10^6$ | $1.10 \times 10^5$ | $3.82 \times 10^8$ | 195.9141 | AA | B | NG | A | A | A |
| Comparative Example 4 | $1.56 \times 10^6$ | $1.10 \times 10^5$ | $6.39 \times 10^8$ | 408.4125 | AA | NG | NG | A | NG | A |
| Comparative Example 5 | $1.42 \times 10^8$ | $1.10 \times 10^5$ | $6.04 \times 10^{10}$ | 424.5226 | AA | NG | NG | A | NG | A |
| Comparative Example 6 | $1.98 \times 10^6$ | $1.10 \times 10^5$ | $2.18 \times 10^6$ | 1.1031 | AA | A | A | NG | A | A |

An image forming apparatus according to a second exemplary embodiment of the present disclosure is basically similar to that according to the first exemplary embodiment, and thus different portions thereof will be described.

Figure 8:
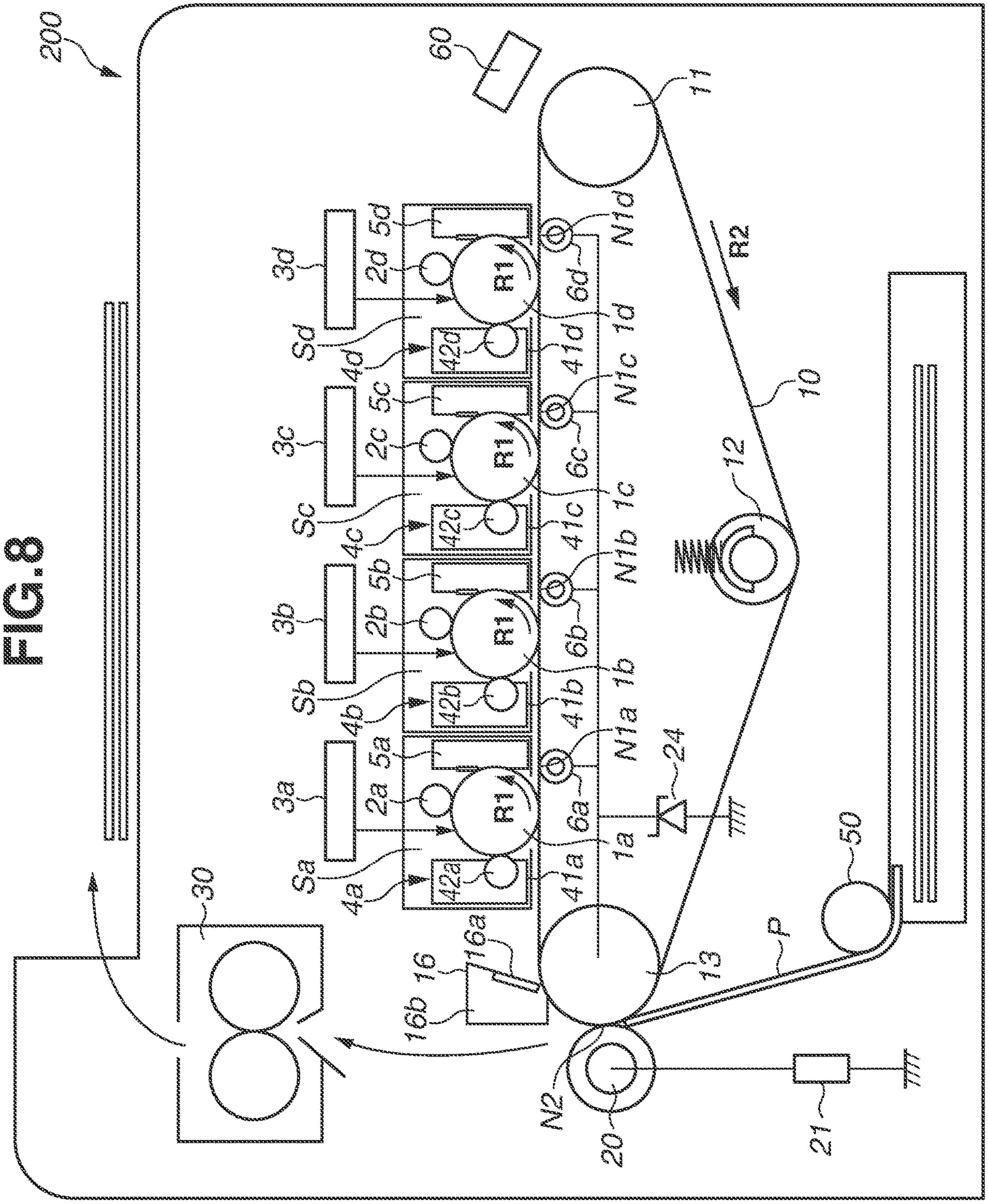
FIG. 8 is a cross-section diagram schematically illustrating an image forming apparatus according to a second exemplary embodiment of the present disclosure.

FIG. 8 is a cross-section diagram schematically illustrating the image forming apparatus 200 according to the second exemplary embodiment of the present disclosure.

As illustrated in FIG. 8, in the configuration of the second exemplary embodiment, the driving roller 11 and the primary transfer rollers 6*a*, 6*b*, 6*c*, and 6*d* are electrically connected to the secondary transfer opposing roller 13, to be a same potential. Since the image forming units Sa, Sb, Sc, and Sd have substantially a same configuration, the image forming apparatus 200 according to the second exemplary embodiment will be described mainly using the first image forming unit Sa.

More specifically, the secondary transfer opposing roller 13, the primary transfer rollers 6*a*, 6*b*, 6*c*, and 6*d* are grounded via a Zener diode 24, which is a voltage support element. In this way, a voltage is supplied to the primary transfer roller 6*a* by the Zener voltage generated at a cathode of the Zener diode 24 by the current supplied from the secondary transfer roller 20 serving as a current supply member.

Further, the primary transfer current supplied from the primary transfer roller 6*a* passes through the inner surface layer 10*b* and reaches the primary transfer nip N1*a*, and then is supplied to the photosensitive drum 1*a*. To obtain a desired primary transferability, the Zener voltage is set to be "300 V" in the present exemplary embodiment.

In the second exemplary embodiment, similar to the first exemplary embodiment, a preferable primary transfer performance can be obtained in the intermediate transfer belt 10 configured of three layers including a base layer, an inner surface layer, and a surface layer.

Further, in the second exemplary embodiment, in place of the primary transfer power source 23 in the first exemplary embodiment illustrated in FIG. 1, the primary transfer voltage is generated using the Zener diode 24 connected to the secondary transfer opposing roller 13 and the primary transfer roller 6*a*. In this way, the second exemplary embodiment has an advantage compared with the first exemplary embodiment that a good primary transfer performance can be obtained with simpler configuration.

An image forming apparatus according to a third exemplary embodiment of the present disclosure is basically the same as that of the first exemplary embodiment or the second exemplary embodiment, and thus different portions will be described below.

Figure 9:
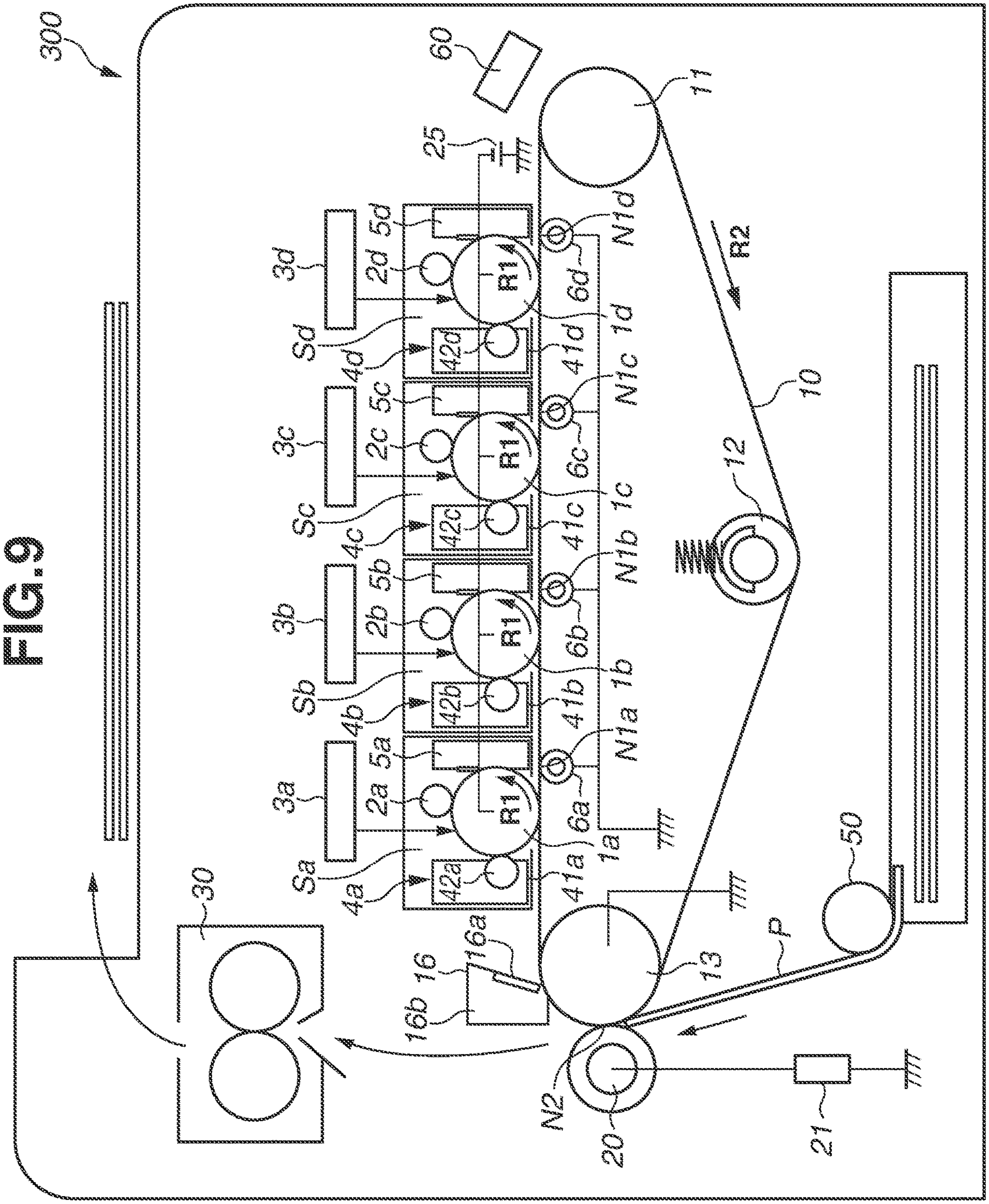
FIG. 9 is a cross-section diagram schematically illustrating an image forming apparatus according to a third exemplary embodiment of the present disclosure.

FIG. 9 is a cross-section diagram schematically illustrating an image forming apparatus 300 according to the third exemplary embodiment of the present disclosure.

In the first and the second exemplary embodiments described above, by applying the primary transfer voltage to form the potential difference between the surface potential of the photosensitive drum 1*a* and the potential of the intermediate transfer belt 10, the toner on the surface of the photosensitive drum 1*a* is primarily transferred to the intermediate transfer belt 10. It is a feature point of the third exemplary embodiment that the primary transfer rollers 6*a* to 6*d* are grounded and a drum power source 25 serving as a negative power source common to the photosensitive drums 1*a* to 1*d* is provided.

More specifically, in the third exemplary embodiment, the drum power source 25 is connected to supply a voltage to each of drum element tubes of the photosensitive drums 1*a* to 1*d*. Hereinbelow, the voltage applied to the drum element tubes by the drum power source 25 is referred to as a "drum voltage".

In the third exemplary embodiment, the potential difference between the surface potential of the photosensitive drum 1*a* and the surface potential of the intermediate transfer belt 10 is formed by adjusting the drum voltage. The configurations except the configuration for performing the primary transfer are the same as those of the first exemplary embodiment and the second exemplary embodiment.

In the third exemplary embodiment, similar to the first and second exemplary embodiments, a good primary transfer performance can be obtained in the intermediate transfer belt 10 configured of three layers including a base layer, an inner surface layer, and a surface layer.

In addition, in the third exemplary embodiment, the primary transfer rollers 6$a$ to 6$d$ can be grounded instead of arranging the drum power source 25 connected to the drum element tubes of the photosensitive drums 1$a$ to 1$d$. In this way, the third exemplary embodiment has an advantage that a stretching unit with a simpler configuration to stretch the intermediate transfer belt 10 can be obtained while obtaining a good primary transfer performance, compared with the first exemplary embodiment and the second exemplary embodiment.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-146410, filed Sep. 8, 2021, and Japanese Patent Application No. 2022-045081, filed Mar. 22, 2022, which are hereby incorporated by reference herein in their entirety.

What is claimed is:

1. An image forming apparatus comprising:

an image bearing member configured to bear a toner image;

an intermediate transfer belt configured to contact the image bearing member and to which the toner image is to be transferred from the image bearing member, wherein the intermediate transfer belt is endless and conductive and includes a base layer, a surface layer formed on an outer circumferential surface side of the base layer, and an inner surface layer formed on an inner circumferential surface side of the base layer; and a contact member configured to contact the intermediate transfer belt from an opposite side of the image bearing member contacting the intermediate transfer belt, wherein, with respect to a rotation center of the image bearing member and as seen from a rotation shaft direction of the image bearing member, a position at which the contact member and the intermediate transfer belt contact is arranged downstream from the image bearing member in a rotation direction of the intermediate transfer belt, wherein $Rv>Rs1$ and $Rs2>Rs1$, and $Rs2/Rv \leq 40$ are satisfied where Rv (Ω) is a volume resistance value of the intermediate transfer belt in a thickness direction, Rs1 (Ω) is a first surface resistance value of the inner surface layer side in a surface direction, and Rs2 (Ω) is a second surface resistance value on the surface layer side in a surface direction, and wherein the volume resistance value Rv is a value in a range from $2.60\times10^6$ (Ω) to $3.51\times10^7$ (Ω).

2. The image forming apparatus according to claim 1, wherein the second surface resistance value Rs2 is $3.00\times10^7$ (Ω) or more.

3. The image forming apparatus according to claim 1, wherein the volume resistance value Rv and the second surface resistance value Rs2 satisfies $Rs2/Rv \leq 22$.

4. The image forming apparatus according to claim 1, wherein the second surface resistance value Rs2 is a value of $7.00\times10^7$ (Ω) or more.

5. The image forming apparatus according to claim 1, wherein the volume resistance value Rv is a value in a range from $4.57\times10^6$ (Ω) to $1.83\times10^7$ (Ω).

6. The image forming apparatus according to claim 1, wherein the second surface resistance value Rs2 is $6.41\times10^8$ (Ω) or less.

7. The image forming apparatus according to claim 1, wherein the base layer is a thickest layer of a plurality of layers included in the intermediate transfer belt in the thickness direction.

8. The image forming apparatus according to claim 1, wherein the surface layer is provided in contact with a surface of the base layer on the outer circumferential surface side.

9. The image forming apparatus according to claim 8, wherein a surface of the surface layer opposite to a surface in contact with the base layer is configured to contact the image bearing member.

10. The image forming apparatus according to claim 1, wherein the inner surface layer is provided in contact with a surface of the base layer on the inner circumferential surface side.

11. The image forming apparatus according to claim 10, wherein a surface of the inner surface layer opposite to a surface in contact with the base layer contacts the contact member.

12. The image forming apparatus according to claim 1, wherein, to cause the intermediate transfer belt to wind around a surface of the image bearing member, the contact member presses the intermediate transfer belt in the thickness direction of the intermediate transfer belt toward a side on which the image bearing member is present from a side on which the contact member is present.

13. The image forming apparatus according to claim 1, further comprising a power source connected to the contact member, wherein, by the power source applying to the contact member a voltage with an opposite polarity opposite to a normal charge polarity of toner of the toner image, the toner image born by the image bearing member is transferred to the intermediate transfer belt.

14. The image forming apparatus according to claim 13, wherein the contact member is a rotatable metal roller.

15. The image forming apparatus according to claim 13, wherein, by the power source applying to the contact member a voltage, a current flows from the contact member to the image bearing member, and the current flows from the inner surface layer in the thickness direction of the intermediate transfer belt toward the image bearing member via the base layer and the surface layer after flowing through the inner surface layer in a circumferential direction.

16. The image forming apparatus according to claim 1, further comprising a power source connected to the image bearing member, wherein the toner image born by the image bearing member is transferred to the intermediate transfer belt, by the power source applying a voltage with a polarity that is the same as a normal charge polarity of toner of the toner image to the image bearing member.

* * * * *